United States Patent [19]
Taniguchi

[11] Patent Number: 5,097,467
[45] Date of Patent: Mar. 17, 1992

[54] SWITCHING TRIGGER DETECTION CIRCUIT IN LINE SWITCHING APPARATUS

[75] Inventor: Ikuo Taniguchi, Inagi, Japan

[73] Assignee: Fujitsu Limited, Kawasaki, Japan

[21] Appl. No.: 381,322

[22] Filed: Jul. 18, 1989

[30] Foreign Application Priority Data

Jul. 18, 1988 [JP] Japan ................... 63-177121

[51] Int. Cl.⁵ ............................................. G06F 11/00
[52] U.S. Cl. ...................................... 371/8.2; 371/68.2
[58] Field of Search ...................... 371/8.2, 11.2, 20.1, 371/68.2; 379/14, 16, 26, 32, 33; 340/825.01; 455/8; 375/38; 370/16

[56] References Cited

U.S. PATENT DOCUMENTS

| | | | |
|---|---|---|---|
| 3,882,456 | 5/1975 | Takada | 371/8.2 |
| 4,117,317 | 9/1978 | Dooley, Jr. et al. | 371/68.1 |
| 4,365,248 | 12/1982 | Bargeton | 340/825.01 |
| 4,677,619 | 6/1987 | Kawai | 371/8.2 |
| 4,680,776 | 7/1987 | Ikeuchi et al. | 371/8.2 |
| 4,782,462 | 11/1988 | Kaplinsky et al. | 340/799 |
| 4,797,903 | 1/1989 | Itoh | 340/825.01 |
| 4,799,237 | 1/1989 | Itoh | 371/8.2 |
| 4,967,406 | 10/1990 | Yagi et al. | 370/16 |

FOREIGN PATENT DOCUMENTS

| | | |
|---|---|---|
| 53-94841 | 8/1978 | Japan . |
| 57-185731 | 11/1982 | Japan . |
| 58-161433 | 9/1983 | Japan . |
| 61-62238 | 3/1986 | Japan . |
| 62-45276 | 2/1987 | Japan . |

Primary Examiner—Jerry Smith
Assistant Examiner—Ly U. Hua
Attorney, Agent, or Firm—Staas & Halsey

[57] ABSTRACT

A switching trigger detection circuit is comprised of a selection unit, a memory unit, and first and second discrimination units. The memory unit stores switching trigger data of each of the line systems related to various switching trigger information at respective bit locations, and the selection unit sequentially specifies the bit location. The first and second discrimination units generate a fault occurrence signal and a fault recovery signal by watching the bit pattern of the switching trigger data stored in the memory unit. A shift of the bit locations is achieved along a guard time including a plurality of guard numbers, and each scan of the swtiching trigger data corresponds to each guard number. Further, the first and second discrimination units are comprised of logic gates to thereby assure a high speed discrimination.

20 Claims, 8 Drawing Sheets

SWITCHING TRIGGER DETECTION CIRCUIT IN LINE SWITCHING APPARATUS

BACKGROUND OF THE INVENTION

1. Field of the Invention

The present invention relates to a line switching apparatus, more particularly to a switching request detection circuit incorporated therein for detecting a switching request signal output by a line in which a fault has occurred.

2. Description of the Related Art

In a multiplex data transmission system, a protection line is provided for a plurality of N main lines, i.e., normal working line, for example, eight lines. When a fault occurs in one of the main lines, a transmission on the faulty main line is switched to the protection line, to maintain the inherent data transmission. This is known as an N vs 1 line switching apparatus. In such a line switching apparatus, there is a current trend toward an increase of the number of channels in accordance with the increased amount of data to be transmitted, and accordingly, the amount of information on the switching request signal is also increased. The switching request signal (hereinafter switching trigger) is generated in response to a line fault or restoration of a faulty line.

In the detection of the switching trigger, a guard time must be taken into consideration, to prevent an erroneous line switching due to an instantaneous pulse induced by noise and the like. But although the guard time is useful for preventing the above-mentioned erroneous line switching, it is disadvantageous from the viewpoint of the limitation of a prescribed line switching processing term, for example, less than 50 ms, imposed thereby.

In the prior art switching trigger detection circuit, the line switching decision is performed by software using a microprocessor, as will be explained later. Therefore, when the number of switching triggers increases, a heavy load due to the related processing is imposed on the microprocessor, and thus the microprocessor controlled switching trigger detection circuit has a problem in that often a correct line switching cannot be completed within the aforesaid prescribed short term, since the microprocessor requires a relatively long time to process and output each line switching decision.

SUMMARY OF THE INVENTION

Accordingly, an object of the present invention is to provide a switching trigger detection circuit in the line switching apparatus, which detection circuit can discriminate the switching trigger at a high speed, whereby a correct line switching can be completed within the prescribed short switching processing term.

To realize the above object, the switching trigger detection circuit is primarily constituted by hardware, not software. The hardware is mainly constituted of a memory means for storing switching trigger information, a selection means for selecting a location of each switching trigger information to be written in the memory means, a first discrimination means for discriminating an occurrence of a fault in the lines, and a second discrimination means for discriminating a restoration of a fault in the lines. The selection means writes each switching trigger information sequentially at continuous bits in a specified address of the memory means, and the first and second discrimination means read the thus-written switching trigger information at respective addresses to discriminate the occurrence of fault in the line or a restoration of the faulty line.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
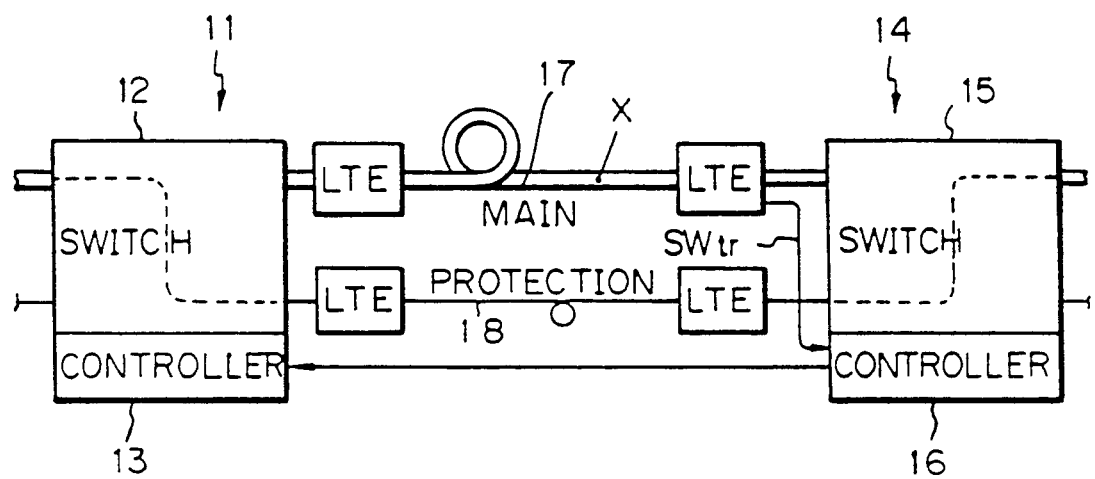
FIG. 1 illustrates a typical multiplex data transmission system.

FIG. 1 illustrates a typical multiplex data transmission system, although only a pair of adjacent line switching apparatuses 11 and 14 are illustrated therein, for brevity. The apparatuses 11 and 14 are connected by lines via line termination equipment (LTE's), and the upper line is a main line 17 including, for example, eleven line systems (SYS1, SYS2, ... ); the lower line is a protection line 18; and the line switching apparatuses 11 and 14 each comprise switching elements, such as relays, 12 and 15, and switching controllers 13 and 16, respectively.

When a fault occurs in one of the line systems (SYS) constituting the main line 17 (marked "X" in the figure), the fault is detected by the downstream line termination equipment (LTE). Soon after the detection, the LTE outputs a line switching trigger $SW_{tr}$ to the switching controller 16 and the controller 16 switches the transmission on the faulty line system to the protection line 18, to form a bypass as depicted by broken lines in the figure. In practice, for example, the elements 11 and adjacent LTE's form another intra-office, and all of these elements form a part of an inter-city telephone network.

Figure 2:
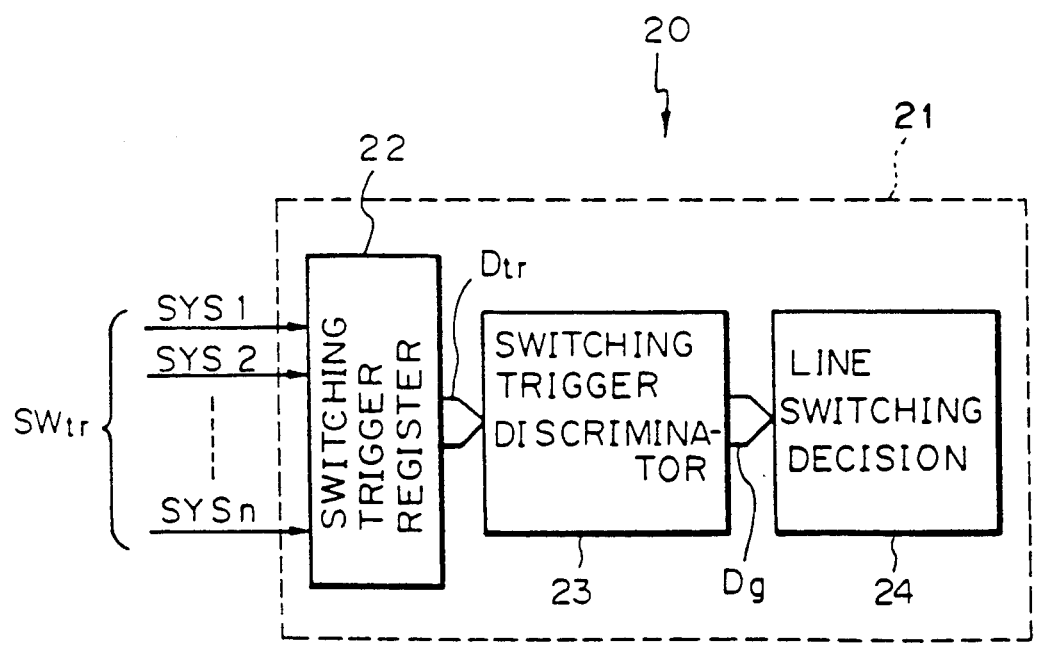
FIG. 2 is a block diagram of a prior art switching trigger detection circuit.

FIG. 2 is a block diagram of a prior art switching trigger detection circuit. A shown in the figure, the switching trigger detection circuit 20 is assembled in the switching controller (refer to 16 in FIG. 1), which receives the switching trigger $SW_{tr}$, and is composed, in total, of a microprocessor 21. The microprocessor 21 is composed of three elements, i.e., a switching trigger register 22, a switching trigger discriminator 23, and a line switching decision part 24. The switching triggers $SW_{tr}$ for the respective line systems SYS1, SYS2 . . .

SYSn are input at the input port of the microprocessor 21 and read thereby. Each switching trigger, i.e., SW'$_{tr}$SYS1, SW$_{tr}$SYS2 ... SW$_{tr}$SYSn, is repeatedly read a plurality of times, to provide the above-mentioned guard time, and the thus read switching triggers are stored in the switching trigger register 22. The stored switching triggers are applied, as trigger data Dtr, to the switching trigger discriminator 23, which processes the data Dtr by software to discriminate whether a line fault has occurred or a faulty line has been restored; this is known as a trigger discrimination.

A plurality of the results of the trigger discrimination are accumulated output as guard data Dg, to the line switching decision element 24, which decides whether the related line should be switched or released.

Specifically, each switching trigger, i.e., SW$_{tr}$SYS1, SW$_{tr}$SYS2 ... SW$_{tr}$SYSn, is read repeatedly by the microprocessor 21, for example, four times, and when the four bits of the guard data are all "1", i.e., "1111", it is determined that a fault has occurred in the corresponding line system. Conversely, when the four bits of the guard data are all "0", i.e., "0000", it is determined that the faulty line system has been restored. If the four bits of the read guard data are read as a random logic, i.e., "1010", it is determined that the line system is affected by noise or the like.

Figure 3:
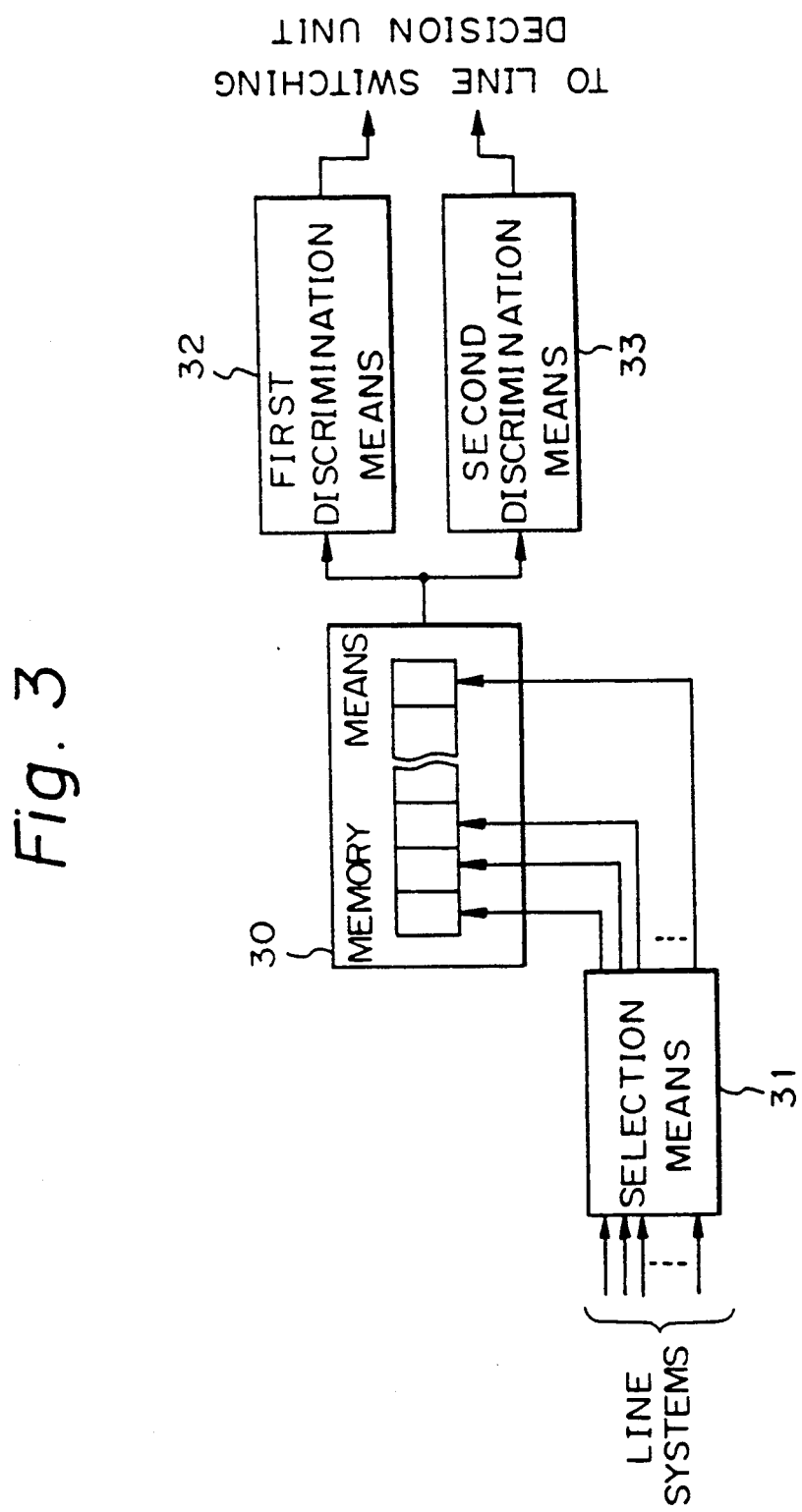
FIG. 3 is a block diagram showing a principle of the switching trigger detection circuit according to the present invention.

FIG. 3 is a block diagram showing a principle of the switching trigger detection circuit according to the present invention. In the figure, reference numeral 30 represents a memory means, and the switching trigger information of each line system is written into this memory means 30 via a selection means 31. The selection means 31 determines a location of each switching trigger information to be written in the memory means 30, and the thus written switching trigger information is applied to both of the first and second discrimination means 32 and 33. The first discrimination means 32 determines an occurrence of a fault in the line system, and the second discrimination means 33 determines a restoration of a line after the fault has been recovered, based on the information written into the memory means 30.

The selection means 31 sequentially writes each switching trigger information a plurality of times at respective locations in the memory means 30, and finally, the results of the discrimination by the first and second discrimination means 32 and 33 are output to a line switching decision unit substantially identical to the above-mentioned line switching decision element 24 shown in FIG. 2. The operation of the circuit shown in FIG. 3 is explained below.

The location of the switching trigger information to be written is shifted in the memory means 30 by the selection means 31 according to the number of switching trigger information accumulated. For example, a first accumulation of this information is allotted to a first location in the memory means 30, and a second accumulation thereof is allotted to a second location in the memory means 30. This is repeated for all of the following accumulations of information. Between the first accumulation and the second accumulation, the selection means 31 scans each line system sequentially, e.g., SYS1 → SYS2→ ... SYSn → SYS1 ..., and thus these scans (SYS1 → SYSn ... ) constitute the above-mentioned guard time. During the guard time, a plurality of said accumulations for each line system are obtained, and if all of the thus accumulated switching trigger information for a line system indicate an occurrence of a fault in the related line system, the first discrimination means 32 determines that a fault has occurred. Conversely, if all of the thus accumulated switching trigger information for a line system indicate a restoration of a fault in the related line system, the second discrimination means 33 determines that a fault has been recovered.

Note, the above-mentioned switching trigger detection is realized by hardware alone, and the above-mentioned software is not used, and thus a high speed detection can be obtained whereby, various kinds of switching trigger information can be processed.

Figure 4:
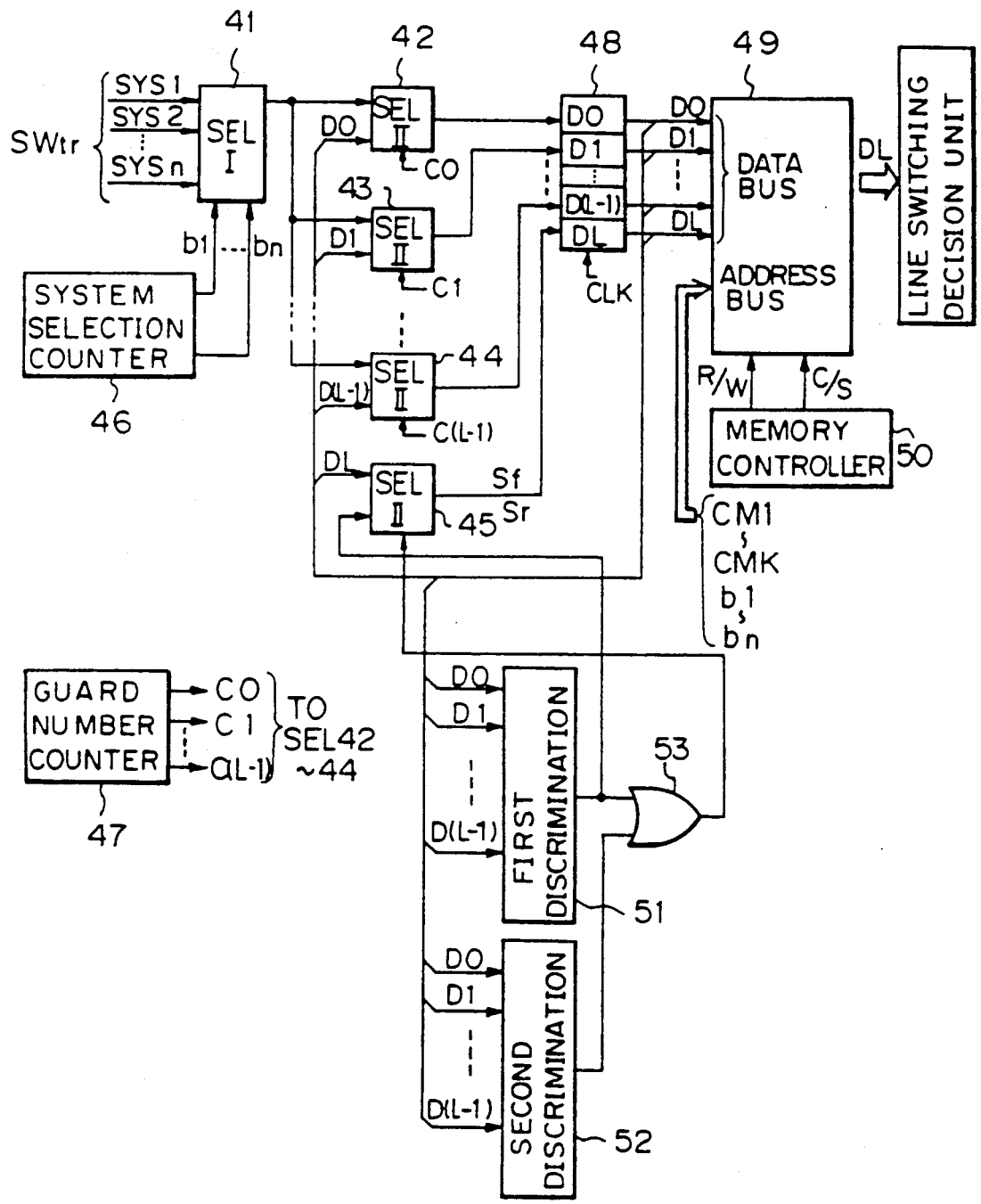
FIG. 4 is a circuit diagram according to an embodiment of the present invention.

FIG. 4 is a circuit diagram according to an embodiment of the present invention, wherein 41 represents a first selector (SEL·I), 42 through 45 are second selectors (SEL·II), 46 is a system selection counter, 47 is a guard number counter, 48 is a latch circuit, 49 is a common memory, 50 is a memory controller, 51 is a first discrimination logic gate for determining the occurrence of a fault in each line system, 52 is a second discrimination logic gate for determining a restoration of a faulty line system, and 53 is an OR gate.

The correspondence between the members shown in FIGS. 3 and 4 is as follows. The selection means 31 of FIG. 3 corresponds to the first and second selector 41 through 45 counters 46, 47, and the latch circuit 48 of FIG. 4, the memory means 30 corresponds to the common memory 49, the first discrimination means 32 corresponds to the first discrimination logic gate 51, and the second discrimination means 33 corresponds to the second discrimination logic gate 52.

The first selector (SEL·I) sequentially selects the line systems, one by one (SYS1 → SYS2 → ... SYSn), and this sequential selection is controlled by the system selection counter 46, which produces system selection pulses bl ... bn corresponding to SYS1 ... SYSn, respectively. The second selector (SEL·II) selects a bit location for each line system to be written in the common memory 49, and this selection of the bit location is controlled by the guard number counter 47, which produces guard selection pulses c0, c1, ... c(L−1). One of the second selectors (SEL·II) is a discrimination selector 45 and is operated when the first discrimination logic gate 51 determines that a fault has occurred, based on the resultant switching trigger data D0 through D(L−1) collected by the second selectors 42 through 44. The discrimination selector 45 is also operated when the second discrimination logic gate 52 determines that a faulty line system is restored, on the same basis. Accordingly, the discrimination selector 45 outputs a fault occurrence signal S$_f$or a fault restoration signal S$_r$ to the latch circuit 48 at a specified input (DL) thereof. The common memory 49 receives the switching trigger data D0 to DL and this data is stored therein. The read/write (R/W) timing control and other controls, such as a chip selection (C/S), are carried out by the memory controller 50. The memory means 49 is comprised of a usual memory, a data bus port, and an address bus port. The data bus port is used for inputting (writing) and outputting (reading) data D0 to DL, and the address bus port receives the system selection pulses bl through bn and command indication bits CM1 through CMk. The command indication bits specify one of various kinds of switching trigger information. In the example, k kinds of switching trigger information exist. The command indication bits CM1 through CMk are supplied sequentially from a command output unit not illustrated in FIG. 4 but contained in the switching controller (refer to 16 in FIG. 1).

The common memory 49 stores the collected switching trigger data D0 to DL. The internal bit allocation will be explained below with reference to the related figures.

Figure 5:
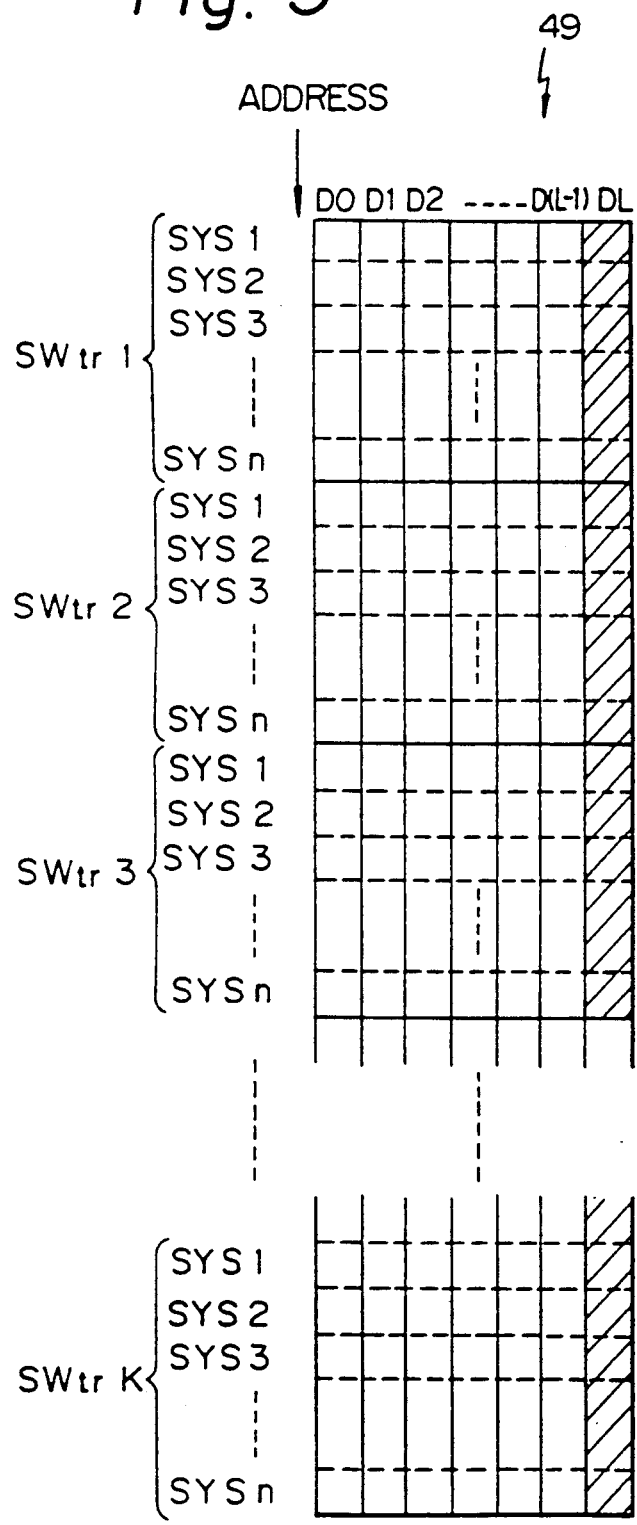
FIG. 5 depicts a bit allocation for explaining the common memory.

FIG. 5 shows a bit allocation for explaining the common memory. The switching trigger information $SW_{tr}$ at top left in FIG. 4 represents various switching trigger information as shown by $SW_{tr}1$, $SW_{tr}2$, $SW_{tr}3$ to $SW_{tr}k$ in FIG. 5. The first switching trigger information $SW_{tr}1$ is detected for every line system SYS1, SYS2 ... SYSn, and then the second switching trigger information $SW_{tr}2$ is detected for every line system SYS1, SYS2 ... SYSn. The same procedure is applied to the remaining information $SW_{tr}3$ through $SW_{tr}k$, and thereby the addresses for writing the switching trigger data D0 are changed sequentially in the direction of an arrow "ADDRESS" shown in the figure, which represents an address scan, and then an identical address scan is sequentially shifted along the data D1, D2 ... D(L−1).

The various switching trigger information indicates respective line switching factors. For example, $SW_{tr}1$ denotes that data is no longer received, $SW_{tr}2$ denotes a major error (note, the critical error rate is $10^{-3}$), and $SW_{tr}3$ denotes a minor error (note, the critical error rate is $10^{-6}$ or $10^{-7}$). When a line quality requires a further improvement, the number of the above line switching factors should be increased.

The resultant data bit DL, shown by hatching in FIG. 5, is at logic "H" when all of the related switching data bits D0 through D(L−1) are logic "H", and this denotes that a fault has occurred in the line system related to one of the switching trigger information ($SW_{tr}1$ through $SW_{tr}k$).

Conversely, the resultant data bit DL is logic "L" when all of the related switching data bits D0 through D(L−1) are logic "L" and this denotes that a fault has been recovered in the line system related to one of the switching trigger information ($SW_{tr}1$ through $SW_{tr}k$).

Figure 6:
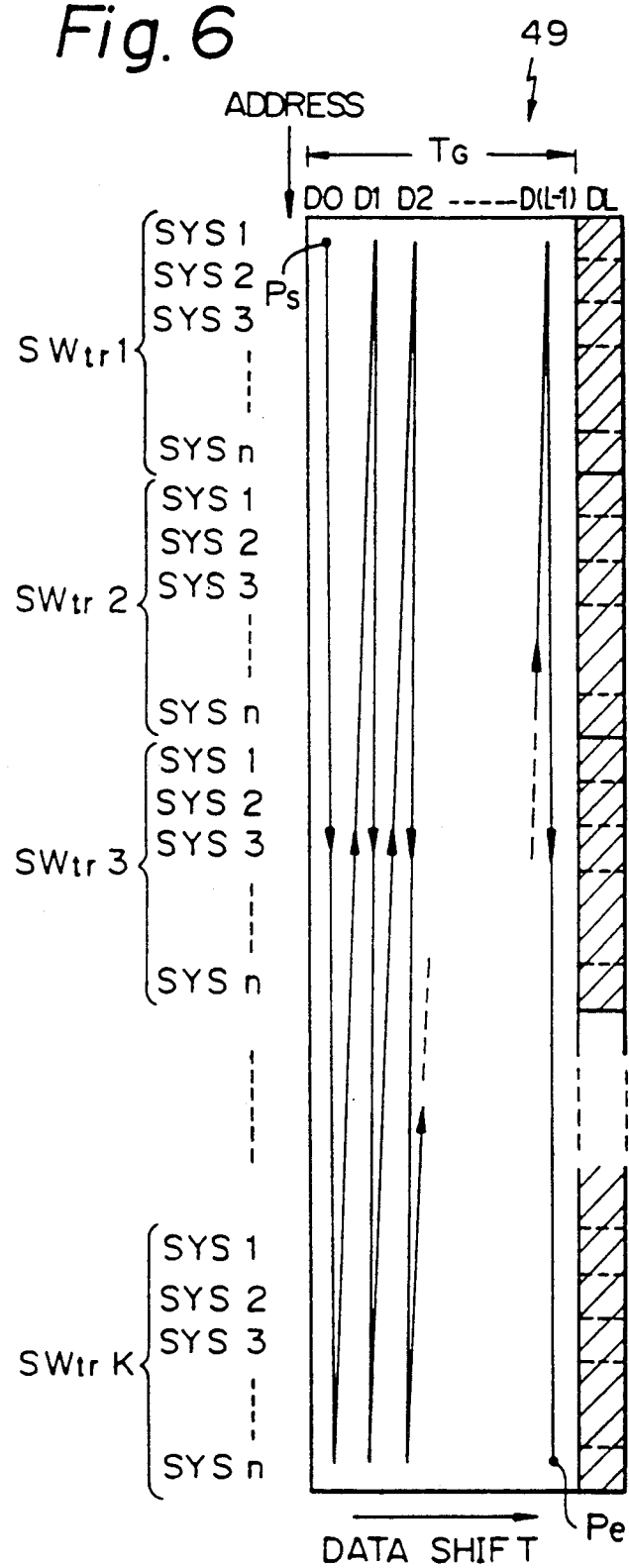
FIG. 6 depicts a schematic address sequence performed in the common memory.

FIG. 6 depicts a schematic address sequence performed in the common memory. As shown in FIG. 6, the arrows following a zig-zag pattern schematically represent the address sequence. The sequence starts from a point $P_S$ and ends at a point Pe, which is one cycle of the sequence, and the identical cycles are repeatedly created. In FIG. 6, the character $T_G$ represents the guard time which includes an L times accumulation of the switching trigger data D0 through DL. Usually the guard number (refer to C0 through C(L−1) in FIG. 4) is selected on the order of "4", i.e., the data D0 to D(L−1) is accumulated at intervals of $$\frac{T_G}{L-1}$$

along the line of an arrow data shift (see "DATA SHIFT" at the bottom of FIG. 6). Note, an advantage of the present invention is that the guard time $T_G$ is automatically assured, because the time needed for each address scan automatically creates the interval $$\frac{T_G}{L-1}$$

Figure 7A:
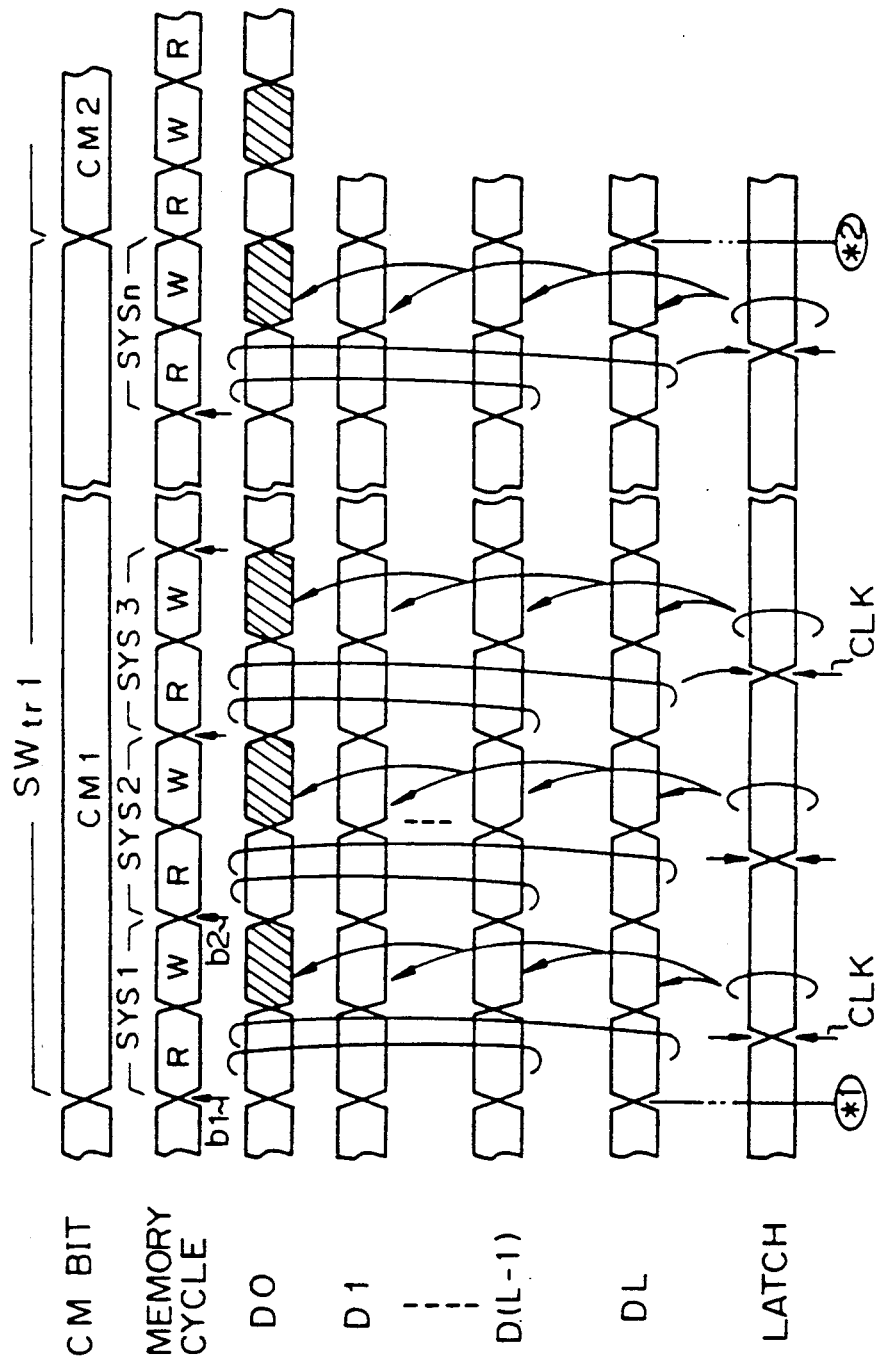
FIG. 7A and 7B are timing charts for explaining an operation of the circuit shown in FIG. 4.
Figure 7B:
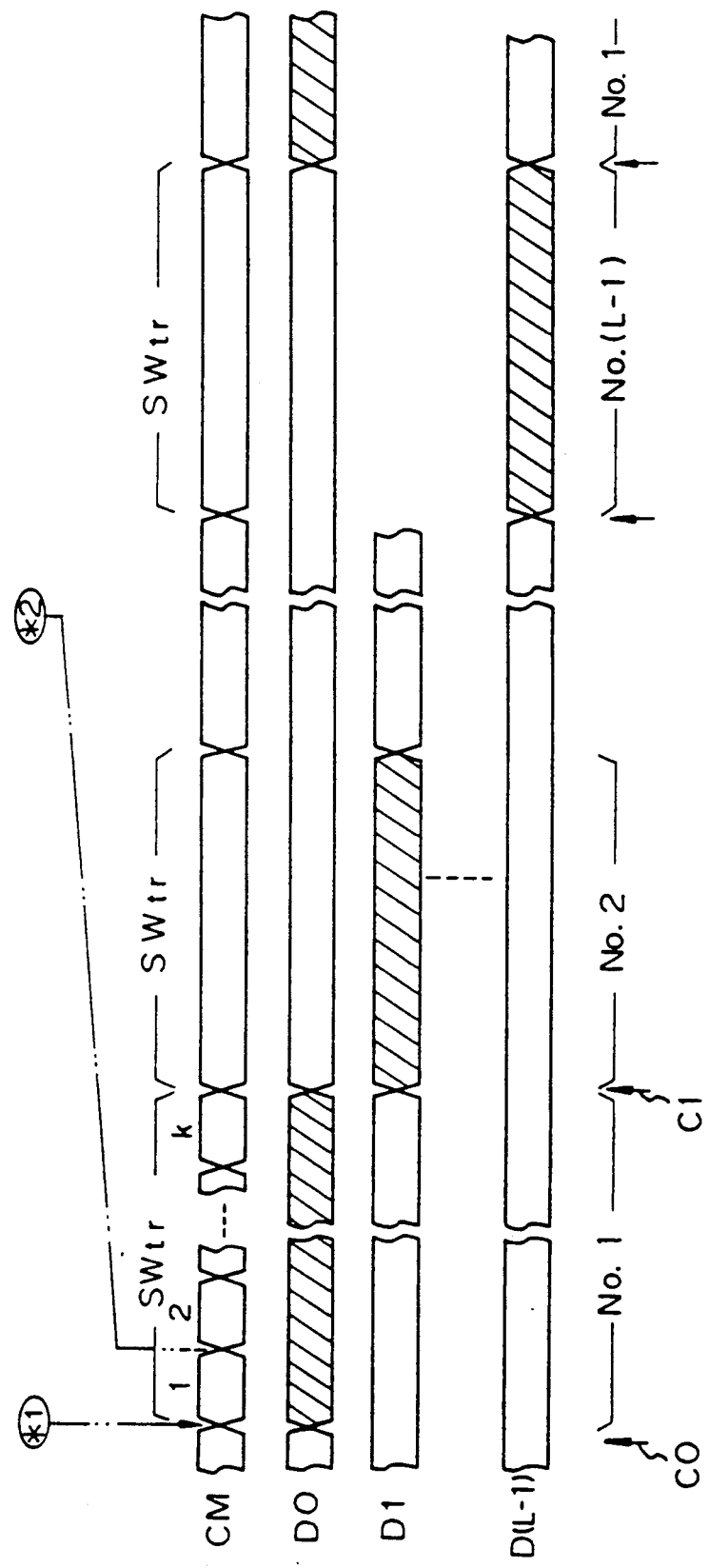

FIGS. 7A and 7B are timing charts for explaining an operation of the circuit shown in FIG. 4. The same reference characters are used in FIGS. 7A and 7B as used in FIGS. 4, 5 and 6. In FIG. 7A, the command indication bit (CM BIT) specifies a variety of each switching trigger information $SW_{tr}1$, $SW_{tr}2$, and so on. In the memory cycle row, "R" denotes a read timing and "W" denotes a write timing, and at each write timing, the switching trigger data is collected from the line systems (SYS), respectively, and written in the common memory 49. In the example, the data shown by hatching is accumulated and written therein.

At the read timing (R) of the common memory 49, when the line system SYS1 related to the information $SW_{tr}1$ is selected by the first selector (SEL·I) 41 and the guard number counter 47 produces a first guard selection pulse C0 (FIG. 4), i.e., the guard number is No. 1, the switching trigger data generated for the SYS1 is accumulated by the selector 42, which receives a pulse C0 produced from the guard number counter 47. Note, at this time the read data D0 from the memory 49 is ignored. Then the thus selected data is supplied to the latch circuit 48 at the input D0, and at the same time, the other selectors 43 and 44, which are not given C1 and C(L−1), select the respective read data D1, D(L−1) from the memory 49 and supply that data to the latch circuit 48 at respective inputs D1, D(L−1) thereof. The data, except for D0, is the last data stored in the memory 49 and only the data D0 is renewed at this time, since the guard number No. 1, i.e., D0, is now specified. Next, the guard number No. 2 will be specified and an operation similar to the above will be started with respect to the SYS2, the selector 44, and the input D1 of the latch circuit 48, and this process is repeated for the following guard numbers.

A feedback of the read data D1 to D(L−1) from the common memory 49 to the respective selectors 43 through 44, at, for example, the guard number No. 1, (same for the following guard numbers) is available for the common memory 49, since, as well known, a memory usually reads and writes a group of bit data. Namely, a memory usually cannot handle bit data independently.

Note, the feedback of a group of bit data D0 through D(L−1) is necessary for watching the overall bit data occurring during each guard time $T_G$, in time series. This watching is carried out by the first and second discrimination logic gates 51 and 52 (FIG. 4), which are supplied with the read data D0 to D(L−1) from the common memory 49. Specifically, the logic gates 51 and 52 supervise the bit pattern of D0 to D(L−1). Namely, if the first discrimination logic gate 51 supervises a first bit pattern and determines that a fault has occurred, the gate 51 outputs a logic "H". This "H" output is applied directly to the discrimination selector 45, and to the selector 45 via the OR 53. In response, the selector 45 outputs a fault occurrence signal $S_f$("H") to the latch circuit 48 input DL.

Conversely, if the second discrimination logic gate 52 supervises a second bit pattern and determines that a fault has been recovered, the gate 52 outputs a logic "H". This "H" output is applied to the selector 45 via the OR 53.

In response, the selector 45 this outputs a fault recovery signal $S_r$("L") to the latch circuit 48 at the input DL thereof.

When the first and second discrimination logic gates 51 and 52 find bit patterns other than the first and second bit patterns, the logic gates 51 and 52 do not produce an output, and therefore, the discrimination selector 45 selects the preceding resultant bit data DL read from the memory 49 and sends this data DL to the latch circuit 48 at the input DL thereof.

Note, the first bit pattern assumes, for example, a logic "HHHH . . . H", and the second bit pattern assumes, for example, a logic "LLL . . . L". During a transition from a normal state to a fault state, the bit pattern in the common memory 49 changes as follows (taking a case of 5 bits as an example, i.e., D0 through D4 (L=5) for brevity).

"LLLLL" (DL="L")
"HLLLL" (DL="L")
"HHLLL" (DL="L")
"HHHLL" (DL="L")
"HHHHL" (DL="L")
"HHHHH" (DL="H")

During a transition from a fault state to a normal state recovery, the bit pattern in the common memory 49 changes as follows (taking a case of 5 bits as an example, i.e., D0 through D4 (L=5) for brevity).

"HHHHH" (DL="H")
"LHHHH" (DL="H")
"LLHHH" (DL="H")
"LLLHH" (DL="H")
"LLLLH" (DL="H")
"LLLLL" (DL="L")

The latch circuit 48 latches the data D0 to DL by the latch clock CLK (FIGS. 4 and 7A bottom), every time each data (D0, D1 . . . DL) is renewed, and the thus latched data D0, D1 . . . DL is written in the memory 49 at respective write timings (W) (refer to upward arrows in FIG. 7A from the row "LATCH" to the rows "D0, D1 . . . DL").

The switching trigger data for the line systems SYS2, SYS3 . . . SYSn is sequentially selected by the first selector 41 (as in the SYS1 mentioned above), and the read and write operations are carried out, whereby the first guard number accumulation for the information $SW_{tr}1$ is completed. A similar collection cycle is repeated for the second guard number accumulation for the information $SW_{tr}2$ and each of the following guard numbers, to the guard number No. (L−1).

The first and second selectors 41 through 45 can be constructed by known semiconductor gate elements comprising transistors; the latch circuit 48 can be constructed by known D-flip flops; and the common memory 49 can be constructed by a known random-access memory (RAM).

Figure 8:
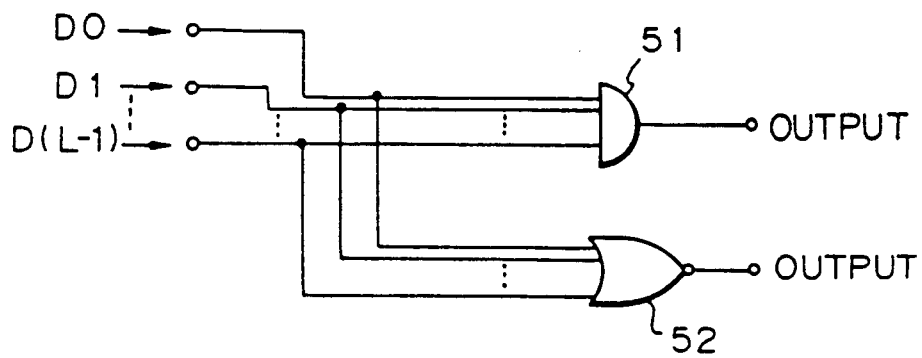
FIG. 8 shows an example of the first and second discrimination logic gates.

FIG. 8 shows an example of the first and second discrimination logic gates. The first discrimination logic gate 51 is comprised of an AND gate, and the second discrimination logic gate 52 is comprised of a NOR gate.

Figure 9:
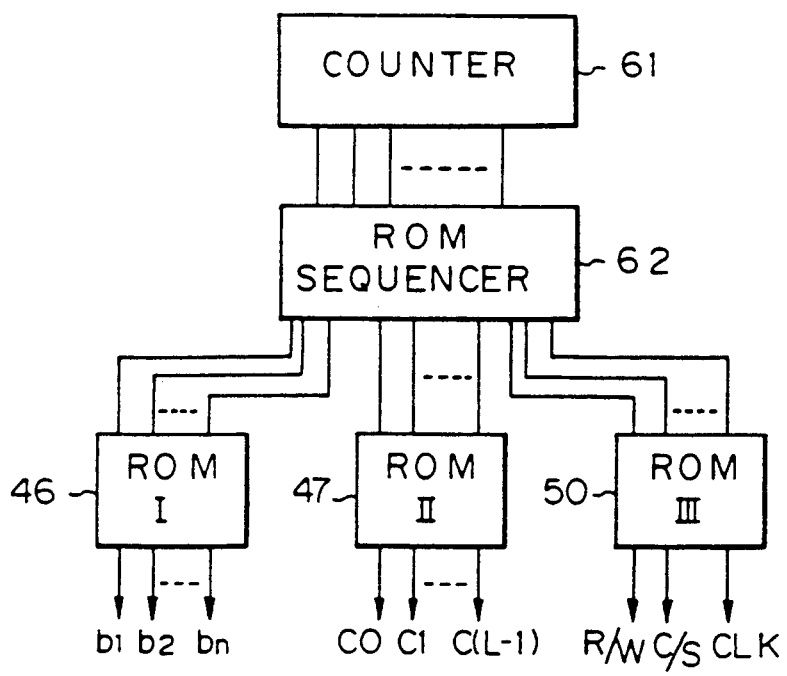
FIG. 9 shows an example of the system selection counter, the guard number counter, and the memory controller.

FIG. 9 shows an example of the system selection counter, the guard number counter, and the memory controller. The system selection counter 46, the guard number counter 47, and the memory controllers 50 are comprised of read only memories ROM·I, ROM·II and ROM·III, respectively, and each of these ROM's is given respective addresses from a known read-only memory (ROM) sequencer 62 containing various timers for specifying respective timings for driving the ROM's 46, 47 and 48. The sequencer 62 is driven by a free-running counter 61. The latch clock CLK to be supplied to the latch circuit 48 (FIG. 4) can be produced from the third ROM·III 50, since this latch clock CLK is synchronous with the read/write (R/W) pulses (FIG. 4).

As explained above in detail, the switching trigger detection circuit of the present invention can be realized in the form of hardware. In the hardware detection circuit each interval $$\frac{T_G}{L-1}$$

for defining the guard time $T_G$ can be determined automatically by each address scan for the common memory (49), and this enables a high speed discrimination of fault occurrences and fault recoveries, with the aid of simple discrimination logic gates (51, 52). Therefore, even though the number of kinds of switching trigger information ($SW_{tr}1$, $SW_{tr}2$ . . .) is increased, the related discrimination for each information can be completed within the prescribed line switching term, e.g., 50 ms, with a margin.

I claim:

1. A switching trigger detection circuit in a line switching apparatus, comprising:
   memory means for storing memory switching trigger information of each line system;
   selection means for sequentially selecting the switching trigger information of each line system to generate selected switching trigger information, said selection means including
      a guard number counter for generating a guard number signal,
      a selector coupled to said guard number counter, for reading the memory switching trigger information from said memory based on the line system selected, for selecting between bits of the memory switching trigger information and bits of the selected switching trigger information to generate selected bits based on the guard number signal, and for selecting a bit location in the memory in which to write the selected bits based on the guard number signal, and
      a latch coupled to said selector, for latching the selected bits and for writing the selected bits into the bit location selected by said selector,
   first discrimination means for discriminating an occurrence of a fault in each of said line systems by monitoring a bit pattern written in said memory means; and
   second discrimination means for discriminating a recover of fault in each of said line systems by monitoring a bit pattern written in said memory means, the resultant discrimination by said first and second discrimination means being used for making a line switching decision.

2. A switching trigger detection circuit as set forth in claim 1,
   wherein said memory means shifts said bit locations for each of said line systems according to the number accumulated of said memory switching trigger information, and
   wherein during two sequential accumulations of said memory switching trigger information, said memory means sequentially scans said memory switching trigger information of every line system.

3. A switching trigger detection circuit as set forth in claim 2, wherein a scanning time for completing each scan of said memory means determines an interval of a guard number contained in each guard time.

4. A switching trigger detection circuit as set forth in claim 3, wherein said memory means is comprises of a memory which is common to a variety of said memory switching trigger information, each of which memory switching trigger information is to be monitored in relation to all of said line systems, sequentially.

5. A switching trigger detection circuit as set forth in claim 4, wherein memory or selected switching trigger information is written into said memory comprising said memory means along said shift of said bit locations while sequentially scanning said variety of memory switching trigger information.

6. A switching trigger detection circuit as set forth in claim 5, wherein each bit series of said memory or selected switching trigger information is provided with a resultant data bit which stores the result of said discrimination achieved by both said first and second discrimination means through the monitoring of said bit patterns of the corresponding series of said memory switching trigger information.

7. A switching trigger detection circuit as set forth in claim 1, wherein the selector of said selection means includes a first selector which selects memory or selected switching trigger information related to each of said line systems sequentially relative to a variety of said memory switching trigger information.

8. A switching trigger detection circuit as set forth in claim 7, wherein the selector of said selection means further includes second selectors arranged in a one to one correspondence with individual bits of said memory or selected switching trigger information which includes a resultant bit data, to be written in said memory means, wherein the resultant bit data indicates the result of said discrimination achieved by both said first and second discrimination means, and wherein the second selectors commonly receive the output from said first selector.

9. A switching trigger detection circuit as set forth in claim 8, wherein said second selectors corresponding to the individual bits of the memory or selected switching trigger information are activated along a shift of said bit locations corresponding to a series of guard numbers included in said guard number signal which define a guard time, and the thus activated second selectors select an output from said first selector while the remaining second selectors select the corresponding memory switching trigger information read from said memory means.

10. A switching trigger detection circuit as set forth in claim 9, wherein one of said second selectors allotted to said resultant bit data acts as a discrimination selector which selects the resultant bit data read from said memory means, and selects the output from said first discrimination means or said second discrimination means when determining that a fault has occurred or a fault has been recovered, respectively, whereby said discrimination selector produces a fault occurrence signal or a fault recovery signal.

11. A switching trigger detection circuit as set forth in claim 10, wherein said first and second discrimination means are commonly supplied with memory switching trigger information read from said memory means.

12. A switching trigger detection circuit as set forth in claim 11, wherein the outputs from said second selectors are written into said memory means via the latch.

13. A switching trigger detection circuit as set forth in claim 12, wherein said latch is comprises of D-flip flops.

14. A switching trigger detection circuit as set forth in claim 10, wherein said discrimination selector produces said fault occurrence signal or said fault recovery signal when receiving one of two outputs, respectively, one of which outputs being directly given from said first discrimination means and the other of said outputs being sent from an OR gate which received both outputs from said first and second discrimination means.

15. A switching trigger detection circuit as set forth in claim 8, wherein said first and second selectors are comprised of semiconductor gate elements comprising transistors which are turned ON or OFF by system selection pulses, output by a system selection counter, and by guard selection pulses output by a guard number counter.

16. A switching trigger detection circuit as set forth in claim 15, wherein said memory means comprises a random-access memory controlled by a memory controller producing at least a read/write control pulse and a chip selection pulse.

17. A switching trigger detection circuit as set forth in claim 16, wherein said system selection counter, said guard number counter and said memory controller are comprised of respective read-only memories (ROM's) driven by a ROM sequencer.

18. A switching trigger detection circuit as set forth in claim 8, wherein said first discrimination means is comprised of an AND gate receiving said memory switching trigger information read from said memory means, and said second discrimination means is comprised of a NOR gate receiving said memory switching trigger information read from said memory means.

19. A switching trigger detection circuit in a line switching apparatus including a plurality of line systems, comprising:

a first selector for sequentially selecting the plurality of line systems to receive first switching trigger information for each of the plurality of line systems during a current time interval to generate selected switching trigger information;

a memory for storing memory switching trigger information corresponding to the current time interval and at least one previous time interval;

a second selector coupled between said first selector and said memory, for selecting between bits of the memory switching trigger information and bits of the selected switching trigger information to generate selected bits of switching trigger information;

a guard number counter coupled to said second selector, for selecting a segment of said memory in which to write the selected bits of switching trigger information, thereby designating a selected segment;

a latch coupled between said second selector and said memory, for latching the selected bits of switching trigger information, and for writing the selected bits of switching trigger information into the selected segment of said memory as the memory switching trigger information;

a first discriminator coupled to said memory, for receiving the memory switching trigger information, and for determining whether a fault occurred in one of the plurality of line systems based on the memory switching trigger information; and a second discriminator coupled to said memory, for
  receiving the memory switching trigger information, and for determining whether a restoration of the fault occurred based on the memory switching trigger information,
the determination of the fault by said first discriminator and determination of the restoration of the fault by said second discriminator being used to make a line switching decision.

20. A switching trigger detection circuit as claimed in claim 19, wherein said second selector includes
  a discrimination selector for selecting a segment of the memory for storing data corresponding to the fault determined by said first discriminator, and corresponding to the restoration of the fault determined by said second discriminator.

* * * * *

UNITED STATES PATENT AND TRADEMARK OFFICE
CERTIFICATE OF CORRECTION

PATENT NO. : 5,097,467
DATED : March 17, 1992
INVENTOR(S) : Ikuo TANIGUCHI

It is certified that error appears in the above-identified patent and that said Letters Patent is hereby corrected as shown below:

Column 2, line 56, after "form"

insert --one intra-office and the elements 14 and adjacent LTE's form--;

Column 4, line 66, change "k" to --$\underline{k}$--;

Column 7, line 6, change "LLL" to --LLLL--;

Column 9, line 2, change "comprises"

to --comprised--;

Column 10, line 2, change "comprises"

to --comprised--.

Signed and Sealed this

Fourteenth Day of September, 1993

Attest:

BRUCE LEHMAN

*Attesting Officer*      *Commissioner of Patents and Trademarks*